United States Patent [19]

Otten et al.

[11] 3,912,972

[45] Oct. 14, 1975

[54] LINE DEFLECTION CIRCUIT FOR CATHODE-RAY TUBES

[75] Inventors: Walter Otten; Günther Stäcker, both of Hamburg, Germany

[73] Assignee: U.S. Philips Corporation, New York, N.Y.

[22] Filed: Jan. 30, 1974

[21] Appl. No.: 437,976

[30] Foreign Application Priority Data

Mar. 21, 1973 Germany ........................... 2313961

[52] U.S. Cl. ................ 315/411; 315/408; 315/410

[51] Int. Cl.$^2$ ........................................ H01J 29/70

[58] Field of Search ........... 315/399, 407, 408, 409, 315/410, 411

[56] References Cited

UNITED STATES PATENTS 3,749,966 7/1973 Ahrens et al. ...................... 315/408

OTHER PUBLICATIONS

Wessel, P. L., *IEEE Transactions on Broadcast and TV Receivers*, Aug. 1972, Vol. BTR-18, No. 3, pp. 177–182.

*Primary Examiner*—Maynard R. Wilbur
*Assistant Examiner*—T. M. Blum
*Attorney, Agent, or Firm*—Frank R. Trifari; Henry I. Steckler

[57] ABSTRACT

A combination deflection circuit and switching mode power supply uses only a single switching element. Across certain diodes in this circuit is a stable voltage. A capacitor and a transformer primary are series coupled to each other and together parallel coupled across at least one of the diodes. A rectifier is coupled to the transformer secondary to provide power to other portions of a television set.

4 Claims, 2 Drawing Figures

LINE DEFLECTION CIRCUIT FOR CATHODE-RAY TUBES

The invention relates to a line deflection circuit for a device comprising a cathode-ray tube particularly a television receiver display tube, for generating a sawtooth current flowing through a deflection coil in which the deflection coil constitutes part of a parallel resonant circuit comprising also a trace capacitor, a retrace capacitor and a first diode, the deflection current flowing during a first part of the trace period through said first diode and during a second part of the trace period through a controllable switch, for example, a transistor, energy being applied from a direct voltage source during the trace period to a first winding arranged between said direct voltage source and the switch, and being applied through a second diode conducting during the retrace period from a second winding to the parallel resonant circuit which is connected to the switch through a third diode conducting during the second part of the trace period.

Such a circuit arrangement is known from "IEEE Transaction on Broadcast and Television Receivers", August 1972, vol. BTR-18, No. 3, pages 177 to 182. The known circuit arrangement is the combination of a transistorized line deflection stage for a television receiver and a stabilised switch mode power supply, whereby one single switching element, the above mentioned transistor is both the switching transistor and the line deflection transistor.

An object of the invention was to further develop this circuit arrangement. It was found that an alternating voltage is present at the above mentioned second and third diode, which voltage is stabilized. The object according to the invention was to utilize this available and unilaterally stabilized rectangular voltage in a particularly advantageous manner.

This object is solved in that in a line deflection circuit of the kind described in the preamble the second and/or third diode is shunted by the series arrangement of a capacitor and a primary winding of a current supply transformer serving via rectifying for the direct current supply to other stages of the device.

An embodiment of the invention is shown in the drawings and will be further described hereinafter.

Figure 1:
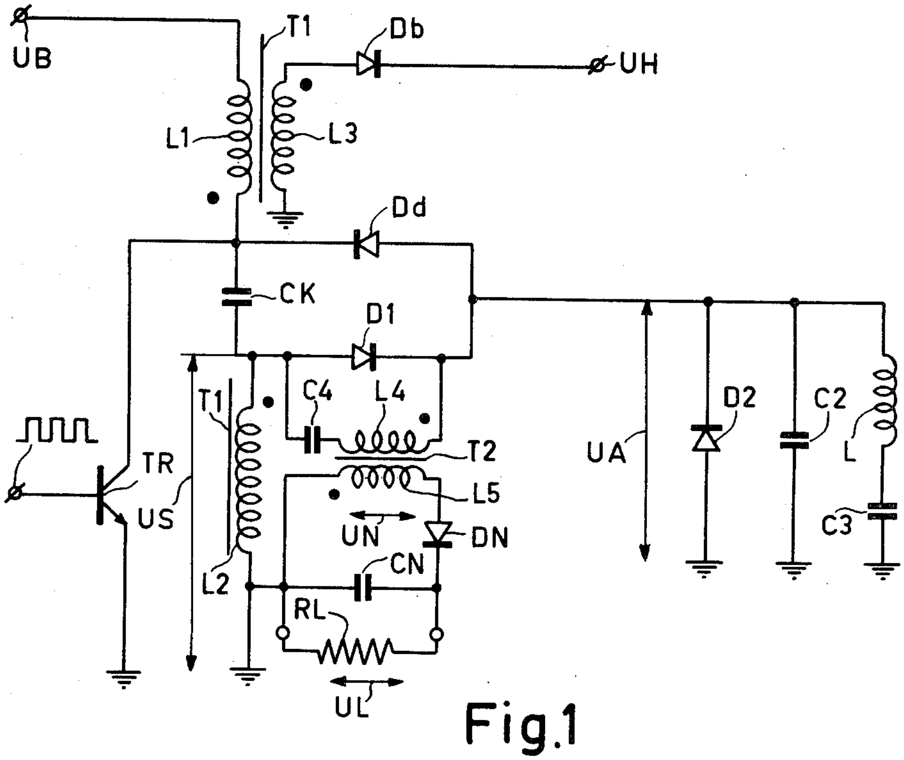
FIG. 1 shows the circuit improved according to this invention.

For the description of FIG. 1 the description of the Figures of the previously cited known circuit may be essentially used as a reference. A transformer is denoted by T1, a primary winding is L1; it is connected through a coupling capacitor CK to a secondary winding L2. A direct voltage source is UB. Furthermore a winding L3 is provided on the transformer secondary side which may serve for the high voltage generation UH through the diode D*b*.

The switching transistor is TR; rectangular pulses with the line frequency and originating from a driver stage (not represented) are applied to this transistor. The entire circuit arrangement thus serves for generating a sawtooth current flowing through a deflection coil L. The deflection coil L is part of a parallel resonant circuit consisting of a retrace capacitor C2, the deflection coil L itself and a trace capacitor C3.

Figure 2:
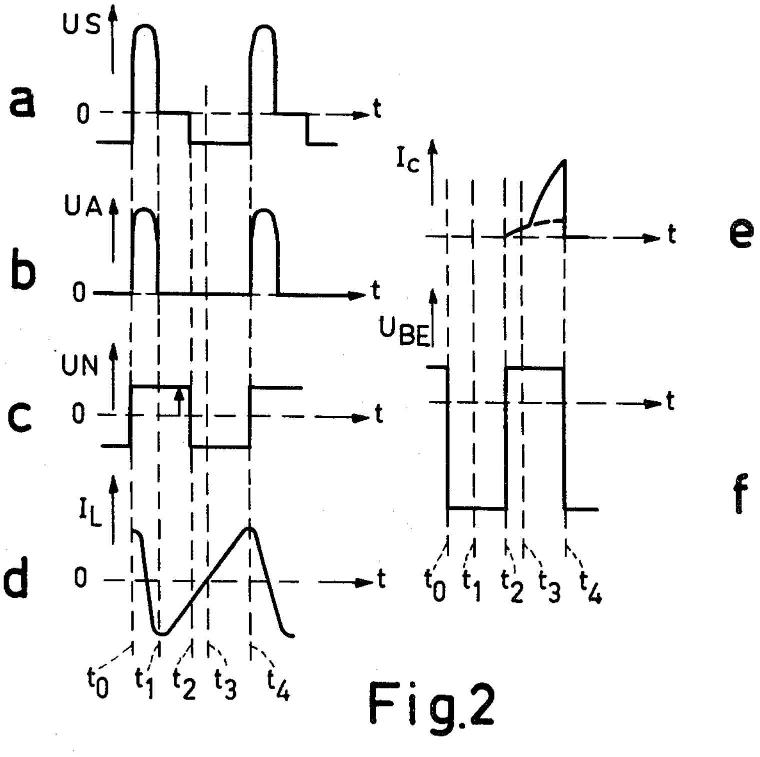
FIG. 2 shows different voltage variations as a function of time.

In the operative condition a first diode D2 which is parallel connected to the said resonant circuit conducts during a first part of the trace period and conveys the negative part of the deflection current $I_2$ during the period from *t*1 to *t*3 (compare FIG. 2*d*). During this period the switching transistor TR is separated from the deflection circuit consisting of D2, L, C2, C3 by a third diode D*d* biassed in the blocking direction.

At the instant *t*2 which is adjustable via the width of the rectangular pulses (compare FIG. 2*f*) at the base of TR, TR is rendered conducting. As a result a current can flow through L1 and TR which stores until the switch-off instant *t*4 the energy required for operating the circuit in L1. This energy is applied to the deflection circuit at the initiation of the retrace period *t*4 so as to compensate for losses. This energy storage is ended at the instant *t*1 of the new period.

Meanwhile the zero crossing of the deflection current occurs at instant *t*3. D2 is blocked. Due to the polarity change of the current $I_L$ the third diode D*d* becomes conducting and the deflection current may be taken over by the switching transistor TR. This current is superimposed uninterfered on the part of the collector current originating from the power supply function of TR.

Thus the deflection function of the circuit in addition to the power supply function is ensured. This function may be influenced by shifting the instant *t*2. The limits of the control range are at *t*1 and *t*3. By comparison, for example, of the voltage UA over the diode D2 in the retrace period with a reference voltage a control magnitude for *t*2 can be derived. A stabilisation of the deflection in case of mains voltage and beam current fluctuations is then possible.

It is often essential to provide further stages in the television display apparatus with a stabilized voltage. Conventionally such supply voltages are obtained by trace rectification on an auxiliary winding of the line transformer. In this circuit this simple possibility is not given due to the connection with the power supply function. As can be seen in FIG. 2*a* the secondary voltage US consists of a rectangular voltage on which the flyback pulse of the deflection circuit is superimposed. When the trace part of US is rectified no stabilized direct voltage can be obtained due to the duty cycle variations caused by the control since the value of the voltage US between the instants $t_2$ and $t_4$ depends on that of the voltage UB.

A flyback rectification is feasible in this case. However, due to the small conduction angle an inadmissibly high internal resistance of the obtained supply voltage is to be taken into account.

According to the invention a rectangular voltage present alternatively across the diodes D1 and D2, respectively is used. These voltages do not contain a flyback pulse FIG. 2*c* shows the voltage variation UN on the secondary side L5 of a transformer T2 introduced for potential separation. A primary winding $L_4$ thereof is arranged in series with a capacitor $C_4$ and this series arrangement shunts the diode D1. The capacitor $C_4$ prevents a dc short circuit of the diode D1 by the winding $L_4$ and has a capacitance which is large enough for preventing an influence upon the variation of UN. The voltage across the capacitor $C_4$ is thus equal to the dc-component of the voltage across the capacitor $C_3$, which component is stabilised since the voltage UA is. The voltage across the winding $L_4$ is equal to the difference between that across the diode D1 and that across the capacitor $C_4$, the first mentioned voltage being equal to $U_A$–$U_S$. The voltage UN across the winding LS, which winding has the indicated winding sense, has the variation shown in FIg. 2*c* and between the instants $t_o$ and $t_2$ it is equal to the stabilised dc-component of the voltage present across the capacitor $C_3$. The voltage UN is rectified with the aid of a diode DN and smoothed with the aid of a capacitor CN. The rectified voltage UL is applied to the parts of the apparatus using a low voltage which in this case are represented by a load resistor RL.

DN must have such a polarity that it conveys current during the time $t_o$–$t_2$. Then the rectified voltage is stabilised to the same extent as the deflection voltage. The conduction angle is large so that the internal impedance of the voltage source is low. The primary side L4 of the transformer T2 is connected to D1 as is shown in FIG. 1. D1 and DN are then conducting simultaneously so that the internal resistance of UN is further reduced. In the same manner the series arrangement of L4 and C4 in parallel with Dd is alternatively possible.

The transformer T2 may be formed with a relatively small core due to the high operating frequency. On account of the switching properties (D*d* and D1 alternately conducting) the rectangular voltage cannot become larger than the direct voltage on CK (corresponds to the voltage UB). Overvoltages as a result of for example picture tube flash-overs are thus prevented.

What is claimed is:

1. A line deflection circuit for generating from a direct voltage source a sawtooth current flowing through a deflection coil, said circuit comprising a parallel resonant circuit comprising said coil, a trace capacitor coupled to said coil, and a retrace capacitor coupled to said coil; a first diode coupled to said retrace capacitor, the deflection current flowing during a first part of the trace period through said first diode and during a second part of the trace period through a controllable switch, energy being applied from said direct voltage source during the trace period to a first winding arranged between said direct voltage source and the switch, and being applied through a second diode conducting during the retrace period from a second winding to the parallel resonant circuit which is connected to the switch through a third diode conducting during the second part of the trace period, at least one of the second and third diodes being shunted by the series arrangement of a capacitor and a primary winding of a current supply transformer, and means for rectifying coupled to said transformer for the direct current supply to other stages of the device.

2. A circuit as claimed in claim 1 wherein said switch comprises a transistor.

3. A circuit for generating from a direct voltage source a sawtooth current having trace and retrace periods through a deflection coil, said circuit comprising a trace capacitor, means for coupling said trace capacitor to said coil, a retrace capacitor coupled to said trace capacitor, diode coupled to said retrace capacitor, a first diode means coupled to said retrace capacitor for conveying said current during a first part of said trace period, a first winding having a first end means for coupling to said source and a second end, a controllable switch means coupled to said second end for conveying said current during a second part of said trace period, a second winding, a second diode means coupled between said first diode and said second winding for conducting during said retrace period, a third diode means coupled between said first diode and said switch for conducting during said second part of said trace period, and means for supplying direct current power comprising a transformer having primary and secondary windings, a capacitor series coupled to said primary, said primary and capacitor being parallel coupled to at least one of said second and third diodes, and a rectifier coupled to said secondary.

4. A circuit as claimed in claim 3 wherein said switch comprises a transistor.

* * * * *